(12) United States Patent
Li et al.

(10) Patent No.: US 12,509,504 B2
(45) Date of Patent: Dec. 30, 2025

(54) METHOD OF TREATING HBV INFECTION BY USING ANTI-PRE-S1 HBV ANTIBODIES

(71) Applicant: HUAHUI HEALTH LTD., Beijing (CN)

(72) Inventors: Wenhui Li, Beijing (CN); Jianhua Sui, Beijing (CN); Pan Chen, Beijing (CN)

(73) Assignee: HUAHUI HEALTH LTD., Beijing (CN)

( * ) Notice: Subject to any disclaimer, the term of this patent is extended or adjusted under 35 U.S.C. 154(b) by 979 days.

(21) Appl. No.: 17/628,462

(22) PCT Filed: Jul. 20, 2020

(86) PCT No.: PCT/CN2020/103121
§ 371 (c)(1),
(2) Date: Jan. 19, 2022

(87) PCT Pub. No.: WO2021/013135
PCT Pub. Date: Jan. 28, 2021

(65) Prior Publication Data
US 2022/0259292 A1    Aug. 18, 2022

(30) Foreign Application Priority Data
Jul. 20, 2019  (WO) ................ PCT/CN2019/096956

(51) Int. Cl.
| A61P 31/12 | (2006.01) |
| C07K 16/08 | (2006.01) |
| C07K 16/10 | (2006.01) |
| A61K 39/00 | (2006.01) |

(52) U.S. Cl.
CPC ............ C07K 16/109 (2013.01); A61P 31/12 (2018.01); C07K 16/082 (2013.01); C07K 16/10 (2013.01); *A61K 2039/505* (2013.01); *A61K 2039/545* (2013.01); *A61K 2039/55* (2013.01); *C07K 2317/94* (2013.01)

(58) Field of Classification Search
CPC .... C07K 16/109; C07K 16/082; C07K 16/10; A61P 31/12; A61K 2039/505; A61K 2039/545

USPC ....................................................... 424/161.1
See application file for complete search history.

(56) References Cited

U.S. PATENT DOCUMENTS

| 7,115,723 | B1 | 10/2006 | Hong et al. | |
| 10,544,205 | B2 * | 1/2020 | Sui | ............ A61P 31/20 |
| 11,485,774 | B2 * | 11/2022 | Sui | ......... C07K 16/082 |
| 2018/0148496 | A1 * | 5/2018 | Sui | ......... C07K 16/082 |

FOREIGN PATENT DOCUMENTS

| JP | 2018-519804 A | 7/2013 |
| KR | 10-2018-0009780 A | 1/2018 |
| WO | WO 2016/188386 A1 | 12/2016 |
| WO | WO 2017/059878 A1 | 4/2017 |

OTHER PUBLICATIONS

Li et al., "A potent human neutralizing antibody Fc-dependently reduces established HBV infections," eLife, Sep. 26, 2017, 6:e26738, 30 pages.
Office Action in Eurasian Patent Application No. 202290123/28 and English translation, Dec. 12, 2023, 7 pages.
Extended European Search Report in European Patent Application No. 20844423.2, dated Aug. 10, 2022, 10 pages.
Korean First Office Action dated Oct. 23, 2025 in Korean Patent Application No. KR 10-2022-7005658 (with attached English translation).
Dan Li et al., "A Potent Human Neutralizing Antibody Fc-dependently Reduces Established HBV Infections," eLife, vol. 6, No. e26738, pager 1-30 (Sep. 26, 2017).

* cited by examiner

*Primary Examiner* — Yan Xiao
(74) *Attorney, Agent, or Firm* — Merchant & Gould P.C.; Daniel J. Pereira

(57) ABSTRACT

A method for treating HBV infection in a subject, comprising administering to the subject an anti-pre-S1 antibody or a fragment thereof at a dose of about 0.1 mg/kg to about 80 mg/kg. Also relates to an anti-pre-S1 antibody or a fragment thereof for use in treating HBV infection.

9 Claims, No Drawings

Specification includes a Sequence Listing.

SEQUENCE LISTING

```
<160> NUMBER OF SEQ ID NOS: 10

<210> SEQ ID NO 1
<211> LENGTH: 7
<212> TYPE: PRT
<213> ORGANISM: Artificial Sequence
<220> FEATURE:
<223> OTHER INFORMATION: HH-003 HCDR1

<400> SEQUENCE: 1

Ser Asn Ser Ala Ala Trp Asn
1               5

<210> SEQ ID NO 2
<211> LENGTH: 15
<212> TYPE: PRT
<213> ORGANISM: Artificial Sequence
<220> FEATURE:
<223> OTHER INFORMATION: HH-003 HCDR2

<400> SEQUENCE: 2

Arg Thr Tyr Tyr Arg Ser Lys Trp Tyr Asn Asp Tyr Ala Val Ser
1               5                   10                  15
```

```
<210> SEQ ID NO 3
<211> LENGTH: 8
<212> TYPE: PRT
<213> ORGANISM: Artificial Sequence
<220> FEATURE:
<223> OTHER INFORMATION: HH-003 HCDR3

<400> SEQUENCE: 3

Gly Thr Arg Trp Gly Met Asp Val
1               5

<210> SEQ ID NO 4
<211> LENGTH: 15
<212> TYPE: PRT
<213> ORGANISM: Artificial Sequence
<220> FEATURE:
<223> OTHER INFORMATION: HH-003 LCDR1

<400> SEQUENCE: 4

Ser Gly Ser Ser Ser Asn Ile Gly Ser Tyr Tyr Val Tyr Trp Tyr
1               5                   10                  15

<210> SEQ ID NO 5
<211> LENGTH: 7
<212> TYPE: PRT
<213> ORGANISM: Artificial Sequence
<220> FEATURE:
<223> OTHER INFORMATION: HH-003 LCDR2

<400> SEQUENCE: 5

Gly Asn Asn Gln Arg Pro Ser
1               5

<210> SEQ ID NO 6
<211> LENGTH: 11
<212> TYPE: PRT
<213> ORGANISM: Artificial Sequence
<220> FEATURE:
<223> OTHER INFORMATION: HH-003 LCDR3

<400> SEQUENCE: 6

Gln Ser Tyr Asp Ser Ser Leu Ser Gly Val Ile
1               5                   10

<210> SEQ ID NO 7
<211> LENGTH: 120
<212> TYPE: PRT
<213> ORGANISM: Artificial Sequence
<220> FEATURE:
<223> OTHER INFORMATION: HH-003 heavy chain variable region

<400> SEQUENCE: 7

Gln Val Gln Leu Gln Gln Ser Gly Pro Gly Leu Val Lys Pro Ser Gln
1               5                   10                  15

Thr Leu Ser Leu Thr Cys Ala Ile Ser Gly Asp Ser Val Ser Ser Asn
                20                  25                  30

Ser Ala Ala Trp Asn Trp Ile Arg Gln Ser Pro Ser Arg Gly Leu Glu
            35                  40                  45

Trp Leu Gly Arg Thr Tyr Tyr Arg Ser Lys Trp Tyr Asn Asp Tyr Ala
        50                  55                  60

Val Ser Val Lys Ser Arg Ile Thr Ile Asn Pro Asp Thr Ser Lys Asn
65                  70                  75                  80

Gln Phe Ser Leu Gln Leu Asn Ser Val Thr Pro Glu Asp Thr Ala Val
                85                  90                  95
```

Tyr Tyr Cys Ala Arg Gly Thr Arg Trp Gly Met Asp Val Trp Gly Gln
                100                 105                 110

Gly Thr Leu Val Thr Val Ser Ser
        115                 120

<210> SEQ ID NO 8
<211> LENGTH: 110
<212> TYPE: PRT
<213> ORGANISM: Artificial Sequence
<220> FEATURE:
<223> OTHER INFORMATION: HH-003 light chain variable region

<400> SEQUENCE: 8

Gln Ser Val Leu Thr Gln Pro Pro Ser Ala Ser Gly Thr Pro Gly Gln
1               5                   10                  15

Arg Val Thr Ile Ser Cys Ser Gly Ser Ser Ser Asn Ile Gly Ser Tyr
            20                  25                  30

Tyr Val Tyr Trp Tyr Gln Gln Leu Pro Gly Thr Ala Pro Lys Leu Leu
        35                  40                  45

Ile Tyr Gly Asn Asn Gln Arg Pro Ser Gly Val Pro Asp Arg Phe Ser
    50                  55                  60

Gly Ser Lys Ser Gly Thr Ser Ala Ser Leu Ala Ile Thr Gly Leu Gln
65                  70                  75                  80

Ala Glu Asp Glu Ala Asp Tyr Tyr Cys Gln Ser Tyr Asp Ser Ser Leu
                85                  90                  95

Ser Gly Val Ile Phe Gly Gly Gly Thr Lys Leu Thr Val Leu
            100                 105                 110

<210> SEQ ID NO 9
<211> LENGTH: 450
<212> TYPE: PRT
<213> ORGANISM: Artificial Sequence
<220> FEATURE:
<223> OTHER INFORMATION: HH-003 heavy chain amino acid sequence

<400> SEQUENCE: 9

Gln Val Gln Leu Gln Gln Ser Gly Pro Gly Leu Val Lys Pro Ser Gln
1               5                   10                  15

Thr Leu Ser Leu Thr Cys Ala Ile Ser Gly Asp Ser Val Ser Ser Asn
            20                  25                  30

Ser Ala Ala Trp Asn Trp Ile Arg Gln Ser Pro Ser Arg Gly Leu Glu
        35                  40                  45

Trp Leu Gly Arg Thr Tyr Tyr Arg Ser Lys Trp Tyr Asn Asp Tyr Ala
    50                  55                  60

Val Ser Val Lys Ser Arg Ile Thr Ile Asn Pro Asp Thr Ser Lys Asn
65                  70                  75                  80

Gln Phe Ser Leu Gln Leu Asn Ser Val Thr Pro Glu Asp Thr Ala Val
                85                  90                  95

Tyr Tyr Cys Ala Arg Gly Thr Arg Trp Gly Met Asp Val Trp Gly Gln
            100                 105                 110

Gly Thr Leu Val Thr Val Ser Ser Ala Ser Thr Lys Gly Pro Ser Val
        115                 120                 125

Phe Pro Leu Ala Pro Ser Ser Lys Ser Thr Ser Gly Gly Thr Ala Ala
    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Val Val Thr Val Pro
            180                 185                 190

Ser Ser Ser Leu Gly Thr Gln Thr Tyr Ile Cys Asn Val Asn His Lys
                195                 200                 205

Pro Ser Asn Thr Lys Val Asp Lys Lys Val Glu Pro Lys Ser Cys Asp
    210                 215                 220

Lys Thr His Thr Cys Pro Pro Cys Pro Ala Pro Glu Leu Leu Gly Gly
225                 230                 235                 240

Pro Ser Val Phe Leu Phe Pro Pro Lys Pro Lys Asp Thr Leu Met Ile
                245                 250                 255

Ser Arg Thr Pro Glu Val Thr Cys Val Val Val Asp Val Ser His Glu
            260                 265                 270

Asp Pro Glu Val Lys Phe Asn Trp Tyr Val Asp Gly Val Glu Val His
        275                 280                 285

Asn Ala Lys Thr Lys Pro Arg Glu Glu Gln Tyr Asn Ser Thr Tyr Arg
    290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ala Pro Ile Glu
                325                 330                 335

Lys Thr Ile Ser Lys Ala Lys Gly Gln Pro Arg Glu Pro Gln Val Tyr
            340                 345                 350

Thr Leu Pro Pro Ser Arg Asp Glu Leu Thr Lys Asn Gln Val Ser Leu
        355                 360                 365

Thr Cys Leu Val Lys Gly Phe Tyr Pro Ser Asp Ile Ala Val Glu Trp
    370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
                405                 410                 415

Lys Ser Arg Trp Gln Gln Gly Asn Val Phe Ser Cys Ser Val Met His
            420                 425                 430

Glu Ala Leu His Asn His Tyr Thr Gln Lys Ser Leu Ser Leu Ser Pro
        435                 440                 445

Gly Lys
    450

<210> SEQ ID NO 10
<211> LENGTH: 216
<212> TYPE: PRT
<213> ORGANISM: Artificial Sequence
<220> FEATURE:
<223> OTHER INFORMATION: HH-003 light chain amino acid sequence

<400> SEQUENCE: 10

Gln Ser Val Leu Thr Gln Pro Pro Ser Ala Ser Gly Thr Pro Gly Gln
1               5                   10                  15

Arg Val Thr Ile Ser Cys Ser Gly Ser Ser Asn Ile Gly Ser Tyr
            20                  25                  30

Tyr Val Tyr Trp Tyr Gln Gln Leu Pro Gly Thr Ala Pro Lys Leu Leu
                35                  40                  45

Ile Tyr Gly Asn Asn Gln Arg Pro Ser Gly Val Pro Asp Arg Phe Ser
        50                  55                  60

Gly Ser Lys Ser Gly Thr Ser Ala Ser Leu Ala Ile Thr Gly Leu Gln
65                  70                  75                  80

```
Ala Glu Asp Glu Ala Asp Tyr Tyr Cys Gln Ser Tyr Asp Ser Ser Leu
            85                  90                  95

Ser Gly Val Ile Phe Gly Gly Gly Thr Lys Leu Thr Val Leu Gly Gln
            100                 105                 110

Pro Lys Ala Ala Pro Ser Val Thr Leu Phe Pro Pro Ser Ser Glu Glu
        115                 120                 125

Leu Gln Ala Asn Lys Ala Thr Leu Val Cys Leu Ile Ser Asp Phe Tyr
        130                 135                 140

Pro Gly Ala Val Thr Val Ala Trp Lys Ala Asp Ser Ser Pro Val Lys
145                 150                 155                 160

Ala Gly Val Glu Thr Thr Thr Pro Ser Lys Gln Ser Asn Asn Lys Tyr
            165                 170                 175

Ala Ala Ser Ser Tyr Leu Ser Leu Thr Pro Glu Gln Trp Lys Ser His
            180                 185                 190

Arg Ser Tyr Ser Cys Gln Val Thr His Glu Gly Ser Thr Val Glu Lys
        195                 200                 205

Thr Val Ala Pro Thr Glu Cys Ser
210                 215
```

METHOD OF TREATING HBV INFECTION BY USING ANTI-PRE-S1 HBV ANTIBODIES

This application is a national stage filing under 35 U.S.C. § 371 of International Application No. PCT/CN2020/103121, filed on Jul. 20, 2020, which claims priority of International Application No. PCT/CN2019/096956, filed on Jul. 20, 2019. The contents of each of these applications are incorporated herein by reference.

FIELD OF THE INVENTION

The present application relates, inter alia, to dosing regimens of an anti-pre-S1 antibody, namely HH-003, for treating HBV infections, particularly chronic HBV infections in a subject in need thereof Also, the present application relates to a pharmaceutical composition or a dosage form of the antibody for use in the treatment of HBV infections, particularly chronic HBV infections.

BACKGROUND OF THE INVENTION

More than one third of the world population has been infected by Hepatitis B virus (HBV), and 240 million people are presently chronically infected. HBV infection and related diseases result in about one million deaths annually.

The surface antigen of HBV is composed of Large (L), Middle (M) and Small (S) proteins. The L and M proteins have additional domains at their N terminal as compared to the S protein which only has the S domain. L contains Pre-S1, Pre-S2, and S domains; M contains Pre-S2 and S domains; S protein contains only the S domain. The pre-S1 domain in L protein is the target molecule of HBV receptor(s) expressed on human hepatic cell surface, and antibodies to the pre-S1 domain of HBV have been reported, e.g. Watashi et al, Int. J. Mol. Sci. 2014, 15, 2892-2905. Relevant literature includes descriptions of the HBV receptor in WO2013159243A1, a humanized antibody from mouse hybridoma, KR127 in U.S. Pat. No. 7,115,723, and pre-S1 peptides in U.S. Pat. No. 7,892,754.

In the international publication WO 2016/188386A1, the present inventors have described and characterized anti-pre-S1 antibodies which can be used for treating HBV infections by inhibiting HBV via specific binding to HBV pre-S1. However, determining a dosing regimen, including the amount of each individual dose and the dosing interval between two doses for an anti-pre-S1 antibody is not straightforward. In the field of pharmaceutics, it is difficult to foresee how the way of dosing a medicament influences the balance between the efficacy and safety. Moreover, the anti-pre-S1 antibody previously disclosed by the inventors, specifically the antibody 2H5-A14, is a first-in-class agent with novel mechanism-of-action and cannot be classified to any well-studied anti-HBV drugs, which gives more uncertainty in predicting how its performance varies with dosing regimens. Accordingly, there is an unmet need for an appropriate dosing regimen of the anti-pre-S1 antibodies in the treatment of HBV infections, as well as a pharmaceutical composition or unit dosage form suitable for use in said regimen.

SUMMARY OF THE INVENTION

In the first aspect, the present disclosure provides a method for treating HBV infections in a subject in need thereof, comprising administering to said subject an effective amount of an anti-pre-S1 antibody or antigen-binding fragment thereof, wherein said anti-pre-S1 antibody or antigen-binding fragment thereof comprising (a) a heavy chain variable (VH) domain comprising an HCDR1 having the amino acid sequence of SEQ ID NO: 1, an HCDR2 having the amino acid sequence of SEQ ID NO: 2, and an HCDR3 having an amino acid sequence of SEQ ID NOs: 3; and (b) a light chain variable (VL) domain comprising an LCDR1 having the amino acid sequence of SEQ ID NO: 4, an LCDR2 having the amino acid sequence of SEQ ID NO: 5, and an LCDR3 having an amino acid sequence of SEQ ID NO: 6, and said antibody is administered at a dose of about 0.1 mg/kg to about 80 mg/kg, preferably about 0.5 mg/kg to about 60 mg/kg, more preferably about 3 mg/kg to about 40 mg/kg.

In the second aspect, the present disclosure provides an anti-pre-S1 antibody or antigen-binding fragment thereof for use in treating HBV infection, particularly chronic HBV infection, wherein said antibody or antigen-binding fragment thereof comprising (a) a VH domain comprising an HCDR1 having the amino acid sequence of SEQ ID NO: 1, an HCDR2 having the amino acid sequence of SEQ ID NO: 2, and an HCDR3 having an amino acid sequence of SEQ ID NOs: 3; and (b) a VL domain comprising an LCDR1 having the amino acid sequence of SEQ ID NO: 4, an LCDR2 having the amino acid sequence of SEQ ID NO: 5, and an LCDR3 having an amino acid sequence of SEQ ID NO: 6, and said antibody is administered at a dose of about 0.1 mg/kg to about 80 mg/kg, preferably about 0.5 mg/kg to about 60 mg/kg, more preferably about 3 mg/kg to about 40 mg/kg.

In the third aspect, the present disclosure provides a unit dosage form comprising an anti-pre-S1 antibody or antigen-binding fragment thereof for treating HBV infections, particularly chronic HBV infections in a subject, wherein said anti-pre-S1 antibody or antigen-binding fragment thereof comprising (a) a heavy chain variable (VH) domain comprising an HCDR1 having the amino acid sequence of SEQ ID NO: 1, an HCDR2 having the amino acid sequence of SEQ ID NO: 2, and an HCDR3 having an amino acid sequence of SEQ ID NOs: 3; and (b) a light chain variable (VL) domain comprising an LCDR1 having the amino acid sequence of SEQ ID NO: 4, an LCDR2 having the amino acid sequence of SEQ ID NO: 5, and an LCDR3 having an amino acid sequence of SEQ ID NO: 6, and wherein said unit dosage form is suitable for use in the method of the first aspect of the present application. In a specific embodiment, the unit dosage form is for intravenous infusion and comprises about 40 mg to about 200 mg, e.g. about 40 mg, about 50 mg, about 60 mg, about 70 mg, about 75 mg, about 80 mg, about 90 mg, about 100 mg, about 150 mg, about 200 mg of the antibody or antigen-binding fragment thereof per 1 ml volume. In another specific embodiment, the unit dosage form of the present application comprises about 40 mg to about 500 mg of the antibody or antigen-binding fragment thereof per unit, e.g. about 40 mg, about 50 mg, about 60 mg, about 70 mg, about 80 mg, about 90 mg, about 100 mg, about 125 mg, about 150 mg, about 175 mg, about 200 mg, about 250 mg, about 300 mg, about 350 mg, about 400 mg, about 450 mg, about 500 mg of the antibody or antigen-binding fragment thereof per unit.

In the fourth aspect, the present disclosure provides an article of manufacture comprising (1) the anti-pre-S1 antibody or antigen-binding fragment thereof as defined in any of the above aspects, or one or more unit dosage form of the third aspect, (2) a label or packaging insert indicating that the antibody or antigen-binding fragment thereof is administered at a dose ranging from about 0.1 mg/kg to about 80 mg/kg, preferably about 0.5 mg/kg to about 60 mg/kg, more preferably about 3 mg/kg to about 40 mg/kg, and (3) a packaging material.

In one embodiment of any of the above aspects, the anti-pre-S1 antibody or antigen-binding fragment thereof comprises a heavy chain variable (VH) domain having at least 95%, 96%, 97%, 98%, 99% or 100% sequence identity to the amino acid sequence of SEQ ID NO: 7; and/or a light chain variable (VL) domain having at least 95%, 96%, 97%, 98%, 99% or 100% sequence identity to the amino acid sequence of SEQ ID NO: 8. In one preferred embodiment, the anti-pre-S1 antibody or antigen-binding fragment thereof comprises a heavy chain variable (VH) domain having the amino acid sequence of SEQ ID NO: 7; and/or a light chain variable (VL) domain having the amino acid sequence of SEQ ID NO: 8.

In one preferred embodiment of any of the above aspects, the anti-pre-S1 antibody or the antigen-binding fragment comprises a heavy chain having at least 95%, 96%, 97%, 98%, 99% or 100% sequence identity to the amino acid sequence of SEQ ID NO: 9; and/or a light chain having at least 95%, 96%, 97%, 98%, 99% or 100% sequence identity to the amino acid sequence of SEQ ID NO: 10. In one preferred embodiment, the anti-Pre-S1 antibody or the antigen-binding fragment of the present application comprises a heavy chain having the amino acid sequence of SEQ ID NO: 9; and/or a light chain having the amino acid sequence of SEQ ID NO: 10.

In preferred embodiments of any of the above aspects of the present application, the antibody or antigen-binding fragment thereof is administered at a dose ranging from about 3 mg/kg to about 40 mg/kg. In more preferred embodiments, the antibody or antigen-binding fragment thereof is administered at a dose of about about 3 mg/kg, about 4 mg/kg, about 4.5 mg/kg, about 5 mg/kg, about 6 mg/kg, about 7.5 mg/kg, about 10 mg/kg, about 12.5 mg/kg, about 15 mg/kg, about 17.5 mg/kg, about 20 mg/kg, about 22.5 mg/kg, about 25 mg/kg, about 27.5 mg/kg, about 30 mg/kg, about 32.5 mg/kg, about 35 mg/kg, about 37.5 mg/kg, or about 40 mg/kg. In specific embodiments, the antibody or antigen-binding fragment thereof is administered at a dose of about about 3 mg/kg, about 10 mg/kg, about 20 mg/kg, or about 40 mg/kg.

In preferred embodiments of any of the above aspects of the present application, the antibody or antigen binding fragment thereof is administered weekly, once every 2 weeks, once every 3 weeks, or once every 4 weeks. In other preferred embodiments, the antibody or antigen binding fragment thereof is administered for a period of 4 to 16 weeks, for example, for a period of 4 weeks, 5 weeks, 6 weeks, 7 weeks, 8 weeks, 9 weeks, 10 weeks, 11 weeks, 12 weeks, 13 weeks, 14 weeks, 15 weeks, or 16 weeks. In preferred embodiments, the antibody or antigen binding fragment thereof is administered weekly for a period of 6 to 12 weeks, e.g. for a period of 6 weeks, 7 weeks, 8 weeks, 9 weeks, 10 weeks, 11 weeks, 12 weeks. In specific embodiments, the antibody or antigen binding fragment thereof is administered every 2 weeks for a period of 6 to 12 weeks, e.g. for a period of 6 weeks, 7 weeks, 8 weeks, 9 weeks, 10 weeks, 11 weeks, 12 weeks. In preferred embodiments, the method of the present application is carried out for a period of time such that the HBV is undetectable.

In preferred embodiments of any of the above aspects of the present application, the antibody or antigen binding fragment thereof is administered intravenously. In more preferred embodiments, the antibody or antigen binding fragment thereof is administered by intravenous infusion.

In an embodiment of any of the above aspects of the present application, the subject is a human, preferably a human adult over 18 years old, for example a human adult at the age of 18 to 45.

In an embodiment of any of the above aspects of the present application, the subject has a baseline HBsAg level between about 1000 to about 100,000 IU/mL before a first dose of HH-003 is administered. For example, the subject of the present application has a baseline HBsAg level above about 1000 IU/mL, above about 2000 IU/mL, above about 3000 IU/mL, above about 4000 IU/mL, above about 5000 IU/mL, above about 10000 IU/mL before a first dose of the antibody or antigen binding fragment thereof is administered.

In an embodiment of any of the above aspects of the present application, the subject has a baseline serum HBV DNA level between about $10^5$ to about $10^9$ IU/mL before a first dose of HH-003 is administered. For example, the subject of the present application has a baseline serum HBV DNA level between about $10^6$ to about $10^9$ IU/mL, between about $10^7$ to about $10^9$ IU/mL, between about $10^8$ to about $10^9$ IU/mL, before a first dose of the antibody or antigen binding fragment thereof is administered. For example, the subject of the present application has a baseline serum HBV DNA level over about $10^5$ IU/mL, over about $10^6$ IU/mL, over about $10^7$ IU/mL, over about $10^8$ IU/mL, over about $10^9$ IU/mL, before a first dose of the antibody or antigen binding fragment thereof is administered. In one embodiment of the present application, the subject is at immune tolerant phase and has a baseline HBV DNA level between about $10^7$ to about $10^9$ IU/mL before a first dose of the antibody or antigen binding fragment thereof is administered. In one embodiment of the present application, the subject is at immune clearance phase and has a baseline HBV DNA level higher than $10^5$ IU/mL before a first dose of the antibody or antigen binding fragment thereof is administered.

In one embodiment of any of the above aspects of the present application, the subject has one or more of the following characteristics:
1) at an age of 18 to 35;
2) having a body weight no less than 45 kg if male, no less than 40 kg if female;
3) having a body mass index (BMI)<28 kg/m$^2$;
4) HBsAg positive for more than 6 months and baseline HBsAg is 1000-100,000 IU/mL before the first dose of the antibody or antigen-binding fragment thereof;
5) at immune tolerant phase and having a baseline serum HBV DNA level of $10^7$-$10^9$ IU/mL and an ALT<1.5× ULN;
6) at immune clearance phase and having a baseline serum HBV DNA level greater than $10^5$ IU/mL and ALT (2-8)×ULN;
7) at immune tolerant phase and having a total baseline bilirubin≤2×ULN;
8) at immune clearance phase and having a total baseline bilirubin≤3×ULN.

In an embodiment of any of the above aspects, the serum HBsAg level is reduced after administering of the antibody or antigen-binding fragment thereof as compared to a baseline serum HBsAg level before dosing.

In an embodiment of any of the above aspects, the serum HBeAg level is reduced after administering of the antibody or antigen-binding fragment thereof as compared to a baseline serum HBeAg level before dosing.

In an embodiment of any of the above aspects, the serum HBV DNA level is reduced after administering of the antibody or antigen-binding fragment thereof as compared to a baseline serum HBV DNA level before dosing.

In an embodiment of any of the above aspects, the ALT level is reduced after administering of the antibody or antigen-binding fragment thereof as compared to a baseline ALT level before dosing.

DETAIL DESCRIPTION OF THE INVENTION

Definitions

Unless specifically defined elsewhere in this document, all other technical and scientific terms used herein have the meaning commonly understood by one of ordinary skill in the art to which this invention belongs.

As used herein, including the appended claims, the singular forms of words such as "a", "an", and "the", include their corresponding plural references unless the context clearly dictates otherwise.

The term "or" is used to mean, and is used interchangeably with, the term "and/or" unless the context clearly dictates otherwise.

In the context of the present disclosure, unless being otherwise indicated, the wording "comprise", and variations thereof such as "comprises" and "comprising" will be understood to imply the inclusion of a stated element, e.g. an amino acid sequence, a nucleotide sequence, a property, a step or a group thereof, but not the exclusion of any other elements, e.g. amino acid sequences, nucleotide sequences, properties and steps. When used herein the term "comprise" or any variation thereof can be substituted with the term "contain", "include" or sometimes "have" or equivalent variation thereof. In certain embodiments, the wording "comprise" also include the scenario of "consisting of".

Antibody and Antigen-Binding Fragment Thereof

The term "HBV pre-S1" as used herein refers to the preS1 domain of the HBV large envelope protein. The antibody of the present application targets to the HBV pre-S1, which does not exist in normal, healthy humans and experimental animals.

Unless being otherwise indicated, the term "antibody" as used herein encompasses antibodies as well as antibody fragments in the broadest sense, as long as it recognizes and binds to human HBV pre-S1. The antibody of the present application in general refers to a monospecific antibody. Antibody binds to specific antigenic determinants or epitopes by means of specific binding sites. An "antigen-binding fragment" means a portion of a full length antibody which can specifically bind to the antigen to which the full length antibody binds. Examples of antibody fragments can include Fab, Fab', F(ab')$_2$ and Fv fragments; diabodies; linear antibodies; single-chain antibody molecules; and multispecific antibodies formed from antibody fragments.

In an embodiment of the present application, the anti-pre-S1 antibody of the present application is an antibody having six CDRs identical to those comprised in the antibody disclosed as 2H5-A14 in WO 2016/188386A1. Preferably, the anti-pre-S1 antibody of the present application is an antibody having a light chain variable region and a heavy chain variable region identical to the light chain variable region and the heavy chain variable region, respectively, comprised in the antibody disclosed as 2H5-A14 in WO 2016/188386A1. In the most specific embodiment, the anti-pre-S1 antibody of the present application is the antibody disclosed as 2H5-A14 in WO 2016/188386A1. The preparation of said antibody becomes clear to one of ordinary skills in the art in view of the disclosure of WO 2016/188386A1. The antibody 2H5-A14 can also be referred as HH-003, which is a broadly neutralizing monoclonal antibody targeting the preS1 region of large (L) envelope protein of hepatitis B virus (HBV). The antibody HH-003 is a human IgG1, with a molecular weight ca. 147 kDa. MoA (mechanism of action) studies showed that HH-003 has distinct mechanism of actions from the existing anti-hepatitis B drugs: it directly blocks viral entry into hepatocytes, and it can also elicit antibody-Fc-dependent immunological effector functions, namely ADCC, and ADCP.

The manufacturing process of the antibody of the present application is exemplified in WO 2016/188386A1. The drug substance of the antibody HH-003 was manufactured under cGMP using a stably transfected CHO cell line, and was purified.

By "specific binding" or "specifically bind to", it means that an antibody exhibits preferential binding to a certain target as compared to other proteins, but this specificity does not require absolute binding specificity. An antibody is considered "specific" for its intended target if its binding is determinative of the presence of the target protein in a sample, e.g. without producing undesired results such as false positives. The antibody or an antigen binding fragment thereof of the present invention will bind to the target protein with an affinity that is at least 2-fold greater, preferably at least 10-fold greater, more preferably at least 20-fold greater, and most preferably at least 100-fold greater than the affinity with non-target proteins. Alternatively or additionally, the antibody or an antigen binding fragment thereof of the present invention will have a binding affinity to its target protein as represented by a KD value of lower than $1\times10^{-8}$ M, lower than $1\times10^{-9}$ M (nM), lower than $1\times10^{-10}$ M, lower than $1\times10^{-11}$ M, or even lower than $1\times10^{-12}$ M.

The antibody of the present application can be subjected to a purification process to remove unwanted materials, resulting in a purified antibody. Conventional methods for purifying antibodies include but not limited to column chromatography methods, which are well known in the art.

The antibody or the antigen-binding fragment of the present invention can be an isolated antibody. By the term "isolated" it means that the antibodies or antigen-binding fragment are at least partially free of other biological materials or non-biological materials from the cells, cell cultures, growth medium, expression system in which they are produced. Said materials may include nucleic acids, proteins, lipids, carbohydrates, buffer, salt or other material such as cellular debris and growth medium.

Pharmaceutical Composition and Unit Dosage Form

A therapeutically effective amount of an anti-pre-S1 antibody of the present application can be formed into a pharmaceutical composition or a unit dosage form administered to a subject, preferably intravenously, more preferably by intravenous infusion.

The term "unit dosage form" (or "dosage unit form") as used herein refers to a physically discrete unit suitable for delivery to the subject to be treated, in which each unit comprises a predetermined amount of active agent calculated to produce the desired therapeutic effect. In addition to the active agent, a unit dosage form may further comprises one or more pharmaceutically acceptable excipients, such as carrier, diluent, or excipient. The unit dosage forms of the present application can be adapted to the method and dosing schedule of the present application so as to achieve desired therapeutic effect of the antibody.

The terms "administration", "administering", "treating" and "treatment" as used herein, when applied to a subject, e.g. an animal, including human, or to cells, tissue, organ, or biological fluid, mean contact of an exogenous pharmaceutical, therapeutic, diagnostic agent, or composition to the subject, cell, tissue, organ, or biological fluid. Treatment of a cell encompasses contact of a reagent to the cell, as well as contact of a reagent to a fluid, where the fluid is in contact with the cell. The term "administration" and "treatment" also include in vitro and ex vivo treatments, e.g., of a cell, by a reagent, diagnostic, binding compound, or by another cell. In the most preferred embodiment, the treatment or administration is conducted intravenously, for example by IV infusion.

The term "therapeutically effective amount" as used herein, refers to the amount of an antibody that, when administered to a subject for treating a disease, or at least one of the clinical symptoms of a disease or disorder, is sufficient to effect such treatment for the disease, disorder, or symptom. The "therapeutically effective amount" can vary with the antibody, the disease, disorder, and/or symptoms of the disease or disorder, severity of the disease, disorder, and/or symptoms of the disease or disorder, the age of the subject to be treated, and/or the weight of the subject to be treated. An appropriate amount in any given instance can be apparent to those skilled in the art or can be determined by routine experiments. In a preferred embodiment of the present application, the dosing amount of the antibody (mg/kg) is based on body weight of the subject, preferably human.

Indication and Patient Group

The method and the antibody or antigen-binding fragment of the present application is intended to be used for treating HBV infection, specifically chronic HBV infection, and therefore for treating chronic hepatitis B (CHB) which is caused by chronic HBV infection. By "chronic HBV infection" it refers to liver infection of hepatitis B virus lasting for a longer period of time, generally for more than six months. Chronic HBV infection may lead to serious health conditions including but not limited to cirrhosis, hepatocellular carcinoma, or even death.

In the context of the present application, by "subject" it refers to an animal, preferably a mammal, e.g., a primate such as a cynomolgus monkey, preferably a higher primate, e.g., a human. The term "subject" is interchangeable with the term "patient" or "individual" in the context of the present application unless otherwise indicated.

The term "HBsAg" refers to surface antigen of the hepatitis B virus (HBV), which can be tested to determine the status of hepatitis B infection. An HBsAg positive test result indicates infection of hepatitis B virus (HBV).

The term "HBeAg" refers to hepatitis B e antigen. Positive HBeAg test result indicates an active infection with the hepatitis B virus.

Based on the state balance between the host immune system and the hepatitis B virus, the course of CHB can be divided into the immune tolerance, immune clearance, immune control and immune escape phases (Catherine M N Croagh and John S Lubel, Natural history of chronic hepatitis B: Phases in a complex relationship, *World J Gastroenterol.* 2014 Aug. 14; 20(30): 10395-10404). During the immune tolerance phase, a higher serum HBsAg level and a higher HBV DNA level can be detected as compared to the immune clearance phase (Yi-Min Zhang et al., HBsAg levels in HBeAg-positive chronic hepatitis B patients with different immune conditions, *World J Gastroenterol.* 2014 Apr. 21; 20(15): 4407-4413).

Chronic hepatitis B immune tolerant patients (also denoted as HBeAg-positive HBV chronic infection in EASL 2017 guidelines (Clinical Practice Guidelines on the Management of Hepatitis B Virus Infection)) are characterized by the presence of serum HBeAg, very high levels of HBV DNA and largely normal level of ALT. Current Guidelines do not recommend treatment for these patients since available anti-viral therapies are not effective. However, there is abundant evidence showing that high viral load is closely related to high risk of cirrhosis and hepatocellular carcinoma, and the risk likely increases overtime with prolonged exposure to HBV infection.

Immune clearance/HBeAg-positive chronic hepatitis (also denoted as HBeAg-positive HBV chronic hepatitis in EASL 2017 guidelines) is characterized by the presence of serum HBeAg, high levels of HBV DNA and elevated ALT. Current guidelines recommend interferon or nucleos(t)ide analogues for treatment, to achieve the goal of inhibiting viral replication and ALT normalization. However, interferon is only effective in a small portion of the patients, while nucleos(t)ide analogues usually require long-term use. Therefore, anti-Pre-S1 antibodies can be a novel and promising therapy for these HBV patients at immune tolerant phase and immune clearance phase.

Accordingly, the subject of the present application can be a subject having HBV infection at immune tolerant phase or at immune clearance phase.

In the context of the present application, the abbreviation "ALT" means alanine aminotransferase. An elevated level of serum ALT generally indicates liver damage and/or inflammation.

EXAMPLES

The following examples are set forth so as to exemplify the embodiments of the present invention, and are not intended to limit the scope of invention.

Example 1

Evaluation of Safety Pharmacology and Pharmacokinetics of HH-003 Antibody

This example describes the assessment of safety pharmacology and pharmacokinetics of HH-003 by testing the antibody at different doses in cynomolgus monkeys and in vitro with blood samples. Reference is made to WO 2016/188386A1 to show the preparation of the anti-Pre-S1 antibodies.

Acute Toxicity

Single-dose acute toxicity studies of HH-003 were conducted in cynomolgus monkeys. IV infusion of HH-003 was conducted and followed by a 14-day observation period. A total of 8 monkeys (4 males and 4 females) were assigned to 4 groups (1 male and 1 female for each of the groups) based on body weights in both sexes. The monkeys were treated via single intravenous infusion with a placebo control (a formulation otherwise the same with HH-003 formulation but having no antibody) for Group 1, or HH-003 at doses of 50, 150, or 500 mg/kg for Groups 2, 3, and 4, respectively. The intravenous infusion rate was 30 mL/kg/hour, and the dose volume was 10 mL/kg. All the animals were euthanized on Day 15 and received a complete necropsy examination.

Parameters evaluated in the study included mortality/morbidity, clinical signs, body weights, food consumption, body temperature, electrocardiogram, clinical pathology (hematology, coagulation, clinical chemistry, and urinalysis), complement, and macroscopic examinations.

Neither mortality nor morbidity was noted in any animals throughout the study. No treatment-related abnormal findings/changes in clinical observations, injection sites, body weights, body temperature, electrocardiogram parameters, complements C3 and C4, or clinical pathology was noted throughout the study.

No test article related macroscopic examination was noted in any of treated animals so that no microscopic examination was conducted.

In summary, no apparent toxicity was observed in cynomolgus monkeys after intravenous infusion of HH-003 at a single dose of 50, 150, or 500 mg/kg. A single dose of intravenous (IV) infusion of HH-003 was well tolerated at a dose up to 500 mg/kg in cynomolgus monkeys. No remarkable changes were observed by clinical observation, hematology or clinical chemistry analysis. No target organ toxicity was identified by gross pathology analysis at the end of 2-week study. The maximum tolerated dose (MTD) was considered to be equal to or greater than 500 mg/kg.

Repeat Dose Toxicity and Pharmacokinetics

Four-week repeat dose study of HH-003 was conducted in cynomolgus monkeys at a dose of 0, 20, 60, and 200 mg/kg, respectively. The objective of this study was to evaluate the toxicity and toxicokinetic profile of HH-003 administered by intravenous infusion to cynomolgus monkeys once weekly for 4 weeks and to assess the reversibility of toxicity following a 4-week recovery period. A total of forty cynomolgus monkeys (20 males and 20 females) were assigned to four groups (5 males and 5 females for each of the groups). Group 1 received a placebo control (a formulation otherwise the same with HH-003 formulation but having no antibody), and Groups 2, 3, and 4 received HH-003 at doses of 20, 60, and 200 mg/kg, respectively. The intravenous infusion rate was 30 mL/kg/hour, and the dose volume was 5 mL/kg. The first three monkeys/sex/group were euthanized on Day 30 and the remaining two monkeys/sex/group were euthanized after a 4-week recovery period on Day 57.

Clinical signs, body weights, body temperature, food consumption, safety pharmacology (blood pressure, blood oxygen saturation, electrocardiogram), ophthalmology, and clinical pathology were monitored periodically during the study. All animals were subjected to necropsy and histopathological examination at sacrifice. Toxicokinetic parameters were evaluated on Day 1 and Day 22. Anti-HH-003 antibody induction, T- and B-lymphocyte populations, cytokine and complements changes were also measured periodically for immunological response.

Neither mortality nor moribundity was noted in any animals throughout the study. No test article-related abnormal symptoms (including injection site) were noted in any animals at 20, 60, or 200 mg/kg of HH-003 as compared to the concurrent control group.

No apparent test article related changes were noted in body weights, food consumption, body temperature, electrocardiogram, ophthalmoscopy, blood pressure, blood oxygen saturation, clinical pathology (hematology, coagulation, clinical chemistry, and urinalysis), lymphocyte subset ($CD3^+$, $CD4^+$, $CD8^+$, $CD20^+$, and the ratio of $CD4^+/CD8^+$), cytokines (TNF-$\alpha$, IFN-$\gamma$, IL-2, IL-4, IL-5, and IL-6), complements (C3 and C4), relative and absolute organ weight, and macroscopic and microscopic examinations at any dosed levels of HH-003 throughout the study. No positive anti-drug antibody (ADA) was detected in all dose groups after dosing.

There was a dose-dependent increase in serum concentrations of HH-003 after administered by intravenous infusion to cynomolgus monkeys at 20, 60, and 200 mg/kg. After repeated intravenous infusion of HH-003 once weekly for 4 doses (on Day 1, Day 8, Day 15 and Day 22), there was a slight elevation in serum concentrations on Day 22 compared with those on Day 1. There was no difference between males and females in main TK parameters ($C_{max}$, AUC, and MRT) of HH-003 after intravenous infusion to cynomolgus monkeys at the dosage of 20-200 mg/kg except that both $C_{max}$ and AUC were higher in female than male with statistically significant at 20 mg/kg on Day 22 and 200 mg/kg on Day 1. After repeated intravenous infusion of HH-003 once weekly for 4 doses, the $AUC_{last\ Day\ 22}/AUC_{last\ Day\ 1}$ values (accumulating index, AI) of HH-003 were 1.52, 1.68, and 1.57 for male animals, and 1.89, 1.65, and 1.46 for female animals, respectively, at the dosage of 20-200 mg/kg. There appeared to a slight degree of drug accumulation after repeatedly treated.

No apparent toxicity or irritation at the injection site was observed in cynomolgus monkeys following intravenous infusion of HH-003 at 20, 60, or 200 mg/kg once weekly for 4 weeks. No apparent test article-related histopathological changes in tissues were noted either. There were no specific concerns identified on vital functions in the cardiovascular, respiratory or central nervous (CNS) systems. No positive ADA was detected after dosing. The no observed adverse effect level (NOAEL) was considered to be 200 mg/kg under the study condition. The corresponding $AUC_{0-168h}$ and $C_{max}$ following a 200 mg/kg dose of HH-003 on Day 22 was 356.79 h*mg/mL and 6038.20 µg/mL in males and 411.82 h*mg/mL and 6752.57 µg/mL in females, respectively.

In summary, at all dose levels, weekly IV infusions of HH-003 were all well-tolerated. No preterm deaths, and no treatment-related toxicities were observed by clinical observation, hematology or clinical chemistry analysis. No target organ toxicity was identified by clinical pathology or histological analysis.

Pharmacokinetics

Single-dose pharmacokinetic studies of HH-003 administered by IV infusion were conducted in cynomolgus monkeys.

A total number of 18 cynomolgus monkeys were assigned into 3 groups, 6 monkeys in each group, 3 females and 3 males. Each group received a single dose of HH-003 via intravenous infusion at the dosage of 5 mg/kg, 15 mg/kg or 50 mg/kg, respectively. The infusion rate was 0.5 mL/kg/min with a dose volume of 5 mL/kg. Blood samples were collected at pre-dose, immediate completion of infusion (±1 min), and 1 h, 2 h, 6 h, Day 2 (24 h), Day 3 (48 h), Day 4 (72 h), Day 5 (96 h), Day 6 (120 h), Day 8 (168 h), Day 11 (240 h), Day 15 (336 h), Day 18 (408 h), Day 22 (504 h), and Day 29 (672 h) after start of infusion. A validated ELISA method was used for quantification of HH-003 concentration. The LLOQ was 0.2 µg/mL in monkey serum.

The key PK parameters determined by a noncompartmental analysis (NCA) are shown in Table 1 below.

TABLE 1

| Dosage | Sex | | $t_{1/2}$ h | $C_{max}$ µg/ml | $AUC_{(0-672\ h)}$ h*µg/ml | $AUC_{INF}$ h*µg/ml | Vz ml/kg | Cl ml/h/kg | MRT h |
|---|---|---|---|---|---|---|---|---|---|
| 5 mg/kg | Male | mean | 182.29 | 120.78 | 11678.14 | 12346.10 | 107.23 | 0.41 | 153.32 |
|  |  | SD | 19.71 | 11.75 | 877.46 | 768.75 | 17.52 | 0.02 | 15.27 |

TABLE 1-continued

| Dosage | Sex | | $t_{1/2}$ h | $C_{max}$ μg/ml | $AUC_{(0-672\,h)}$ h*μg/ml | $AUC_{INF}$ h*μg/ml | Vz ml/kg | Cl ml/h/kg | MRT h |
|---|---|---|---|---|---|---|---|---|---|
| | Female | mean | 201.53 | 117.76 | 10705.87 | 11497.80 | 127.46 | 0.44 | 153.50 |
| | | SD | 19.72 | 2.71 | 1478.19 | 1761.26 | 12.45 | 0.07 | 18.45 |
| 15 mg/kg | Male | mean | 212.60 | 369.47 | 33012.25 | 35714.05 | 128.71 | 0.42 | 158.75 |
| | | SD | 53.06 | 6.62 | 1255.14 | 525.57 | 31.63 | 0.01 | 5.09 |
| | Female | mean | 163.18 | 301.75 | 28006.74 | 29732.77 | 118.64 | 0.54 | 142.85 |
| | | SD | 59.50 | 25.32 | 8292.22 | 10497.68 | 5.18 | 0.17 | 34.86 |
| 50 mg/kg | Male | mean | 193.71 | 1189.50 | 107337.77 | 116151.71 | 119.70 | 0.45 | 165.57 |
| | | SD | 49.45 | 78.54 | 19760.60 | 25239.12 | 8.14 | 0.11 | 19.29 |
| | Female | mean | 225.59 | 995.32 | 100735.80 | 113257.82 | 146.39 | 0.47 | 180.22 |
| | | SD | 53.63 | 234.91 | 27760.19 | 36930.41 | 12.47 | 0.15 | 14.03 |

According to above results, no significant difference was observed with respect to pharmacokinetics parameters ($t_{1/2}$, $C_{max}$, AUC and MRT) of HH-003 between females and males, except $C_{max}$ in 15 mg/kg group (P>0.05). $C_{max}$ and $AUC_{(0-672h)}$ of HH-003 showed a dose-dependent increase in serum concentrations after IV infusion to cynomolgus monkeys at 5, 15, and 50 mg/kg. The mean values of $t_{1/2}$ ranged from 163.18 to 225.59 hours, and the mean values of MRT ranged from 142.85 to 180.22 hours. After IV infusion to cynomolgus monkeys at 5, 15, and 50 mg/kg, the mean values in male and female of the $C_{max}$ ratio of HH-003 were 1:3.06:9.85 and 1:2.56:8.45, respectively. For IV infusion of 5, 15, and 50 mg/kg of HH-003, the mean values of the $AUC_{(0-672h)}$ ratio of HH-003 in males and females were 1:2.83:9.19 and 1:2.62:9.41, respectively.

In summary, the results demonstrated that the pharmacokinetics of HH-003 was linear at doses from 5 to 50 mg/kg. Specifically, the peak concentrations ($C_{max}$) and overall exposures (AUC) were generally dose-proportional over the 10-fold dose range evaluated. There was no apparent impact of dose on the estimation of half-life.

Special Toxicity

In vitro hemolysis study was conducted using blood samples from human, SD rat and cynomolgus monkey. HH-003 did not cause any hemolysis or hemagglutination up to 5 mg/ml.

In vitro cytokine release assay was used to assess the potential of HH-003 to trigger cytokine release syndrome in clinical administration. With freshly isolated PBMCs from 34 healthy donors, 12 pro-inflammatory cytokines were evaluated (IL-1β, IL-2, IL-4, IL-6, IL-8, IL-10, TNF-α, IFN-γ, GM-CSF, MCP-1/ CCL2, MIP-1/ CCL3, IP-10/ CXCL10). There were no significant differences in the release profile of these cytokines treated either with HH-003 or isotype control Bevacizumab (Avastin), suggesting that HH-003 had low potential to induce cytokine release in vivo.

In vitro preclinical safety studies have been performed to assess potential off target binding by HH-003. HH-003 was used in a cross reactivity (TCR) study using tissues from three cynomolgus monkey and three human adult donors, respectively. The concentrations of biotin labeled HH-003 used were 1 and 5 μg/mL. Positive staining of biotin-HH-003 was observed in cytoplasm of human smooth muscle and cytoplasm of connective tissues of cynomolgus monkey, while no positive staining with tissues of SD rat. As HH-003 could not enter the cytoplasm, these positive staining signals are considered of little biological implications.

Safety pharmacology monitoring was incorporated into general toxicology studies. No specific concerns were identified on vital functions in the cardiovascular, respiratory or central nervous (CNS) systems (Core Battery).

Example 2

Evaluation of Safety and Pharmacokinetics of the HH-003 Antibody in Healthy Human This example describes a placebo-controlled, randomized, double-blind, single dose, dose escalation study to evaluate the safety and pharmacokinetics of HH-003 in healthy subjects (Phase Ia trial).

Although the target of HH-003, the preS1 domain of the HBV large envelope protein, does not exist in normal, healthy humans and experimental animals, the present inventors began FIH (first-in-human) safety assessment in healthy human subjects, since a) HH-003 is a first-in-class agent with novel mechanism-of-action and cannot be classified to any well-studied anti-HBV drugs; b) unlike infected individuals, healthy volunteers have no confounding factors from underlying disease caused by HBV infection which might interfere with the safety assessment of the new agent; and c) healthy subjects would allow identification of off-target effect or other unexpected toxicity of the new agent.

44 healthy volunteers, male or female, 18-45 years of age were enrolled. The inclusion and exclusion criteria of the subjects are specified as follows.

Inclusion Criteria
1) Male or female, aged 18 to 45 years old.
2) Weight: greater than 50 kg for males, and greater than 45 kg for females. Subject body mass index (BMI) is <28 kg/m².
3) Participants agree to take effective contraceptive measures throughout the study period (from screening to 6 months after dosing) (effective contraceptive measures include: vasectomy, abstinence, use of condoms);
4) Participants fully understand the contents of the study prior to the trial and voluntarily sign a written informed consent form;
5) Participants are able to communicate well with the investigator and are able to complete the study in accordance with the study protocol.

Exclusion Criteria

A volunteer will be excluded from study participation if one or more of the following conditions apply:
1) Those who have any history of serious clinical disease or have an history of illness of circulatory, endocrine, nervous system, blood system, immune system, or mental illness and metabolic abnormalities;
2) Those who have drug or food allergies, history of allergic diseases, or who are allergic to this product or its ingredients;
3) Individuals with infectious or non-infectious liver disease, including hepatitis C, alcoholic, nonalcoholic fatty, drug-induced or autoimmune liver disease;

4) Individuals had chronic infectious diseases such as tuberculosis;
5) Those who have had clinically significant diseases or have undergone surgery within 4 weeks before the trial;
6) Those who have clinically significant abnormalities in laboratory tests (routine blood test, blood biochemistry, routine urine test, routine stool test, coagulation test, etc.);
7) Those who have clinically significant abnormalities on Electrocardiogram or abnormal vital signs (systolic blood pressure <90 mmHg or >140 mmHg, diastolic blood pressure <50 mmHg or >90 mmHg; heart rate <50 bpm or >100 bpm);
8) Those who are positive for HIV, HCV, TP-Ab or HBsAg;
9) Those who are currently taking a large amount of alcohol (i.e. more than 14 units of alcohol per week [1 unit=360 mL of beer or 45 mL of alcohol with 40% of spirits or 150 mL of wine]); or quit smoking for less than 3 months, or those who cannot quit smoking during the period;
10) Those who have immune-mediated disease history (e.g., idiopathic thrombocytopenic purpura, systemic lupus erythematosus, rheumatoid arthritis, autoimmune hemolytic anemia, severe psoriasis, or any other autoimmune disease);
11) Those who are having thyroid diseases, mental illnesses, acute infections (such as influenza), gastrointestinal diseases (including inflammatory bowel disease, peptic ulcer disease, gastrointestinal bleeding);
12) Those women who are pregnant or lactating, or pregnancy test positive;
13) Those who have participated in any drug clinical trial within 3 months prior to the trial;
14) Those who have blood donation within 4 weeks prior to the trial or planned to donate blood during the study period or within 4 weeks after the end of the study (>400 ml);
15) Those who may not be able to complete the trial for other reasons or not be suitable to participate in the trial as judged by the investigators.

This was a placebo-controlled, randomized, double-blind study of HH-003 administered by IV infusion at dosages of 0.5, 1.5, 4.5, 10, 20 and 40 mg/kg (Groups 1-6). In the first dose group (Group 1), 4 participants were enrolled and all receive HH-003; in each of the other 5 groups (Groups 2-6), 8 participants were randomized to receive HH-003 (active drug, A) or placebo (P) at a ratio of 6:2 (6A2P).

Sentinels were set for all dose groups. Enrollment began with the lowest dose group (Group 1:0.5 mg/kg). Following the first administration of the antibody to one of the subject in this group, the study team waited 2-7 days for safety evaluations to be completed by a third party doctor before administering HH-003 to the other 3 subjects within the same group. For the rest 5 dose groups (Group 2-6), the first two subjects were first enrolled and randomized to receive HH-003 or placebo (1A1P:1 with HH-003 and 1 with placebo), the study team also waited 2-7 days for safety evaluations to be completed by a third party doctor before administering HH-003 or placebo to the other 6 subjects within the same group (5A1P). Enrollment in Group 2 (1.5 mg/kg) began after Day 28±2 safety data from all participants in Group 1 was available, and after reviewing and approval by a third party doctor. The same strategy was applied to the enrollment of the other groups.

All participants were followed up for 12 weeks to assess safety and pharmacokinetics of HH-003.

Safety evaluation indicators including adverse events, physical examination, vital signs, 12-lead ECG, chest radiograph, and safety laboratory test indicators were monitored and recorded. Safety laboratory tests including routine blood test, blood biochemistry, routine urine test, routine stool test, and coagulation test were conducted. Adverse events that occurred in this trial were coded in accordance with the standard medical terminology for pharmacy management (MedDRA 20.0 and above).

In this study, safety of the antibody at the tested doses was evaluated based on the observations of safety indicators, including adverse events such as symptoms, vital signs, and laboratory tests within 2 weeks following HH-003 infusion. Further safety indicators, including adverse events such as symptoms, vital signs, 12-lead ECG, chest radiograph, and laboratory examination abnormalities were monitored and recorded during 12 weeks following HH-003 infusion. Pharmacokinetics was evaluated at representative time points throughout the study. The number of participants with response to the anti-HH-003 antibody (ADA), the detected level and timing of ADA in the subjects were monitored and recorded throughout the study and within 12 weeks following HH-003 infusion.

The safety data of all finished groups demonstrated excellent safety profile in healthy volunteers. During the study, no drug related Grade 3 or above AEs including SAEs were reported; no hypersensitivity reactions or cytokine release syndrome related symptoms were observed; no clinical meaningful changes in vital signs, 12-lead ECG, chest radiograph from baseline were noted; all reported AEs were mild and transient and fully recovered with no sequalae.

A validated ELISA method (LLOQ: 50 ng/mL) was used for quantification of HH-003 concentration. The key PK parameters of the groups 1-5 were determined by a non-compartmental analysis (NCA). Peak ($C_{max}$) and overall exposures (AUC) were generally dose-proportional over the 40-fold dose range evaluated (0.5 mg/kg-20 mg/kg), suggesting good linear PK characteristics of HH-003 in healthy volunteers.

Example 3

Determination of Maximum Recommended Initial Dose for the HH-003 Antibody

The maximum recommended initial dose (MRSD) for first HH-003 clinical trial in healthy individuals was set as 3 mg/kg based on the NOAEL (No Observed Adverse Effect Level) obtained in healthy cynomolgus monkeys (over 200 mg/kg) and HBV-infected liver-humanized chimeric mice (over 50 mg/kg), and with a safety factor greater than 60 and 15, respectively. The determination of MRSD also considered the common dose range of other mAbs in human trials, the target of HH-003 being non-immune modulators or cells, and the negative result of HH-003 in a cytokine release experiment using human PBMCs as described in above Example 1.

Example 4

Evaluation of Safety and Pharmacokinetics of Repeated Doses of HH-003 Antibody in Treatment Naïve CHB Patients The study as described by this example is ongoing and aims to evaluate the safety and pharmacokinetics of HH-003 when given in repeated doses in treatment naive CHB patients (Phase Ib trial). The study is also to obtain pharmacodynamic data on HH-003 and to explore antiviral activity of the agent. Results from this study can support the dosing regimen of the present invention.

Total 64 treatment naïve, HBeAg positive CHB patients will be enrolled and grouped into two subgroups: immune tolerant group (subgroup 1) and immune clearance group (subgroup 2). By the filing date of the present application, 23 CHB patients have been enrolled (15 in subgroup 1 and 8 in subgroup 2).

Pre-clinical studies showed that HH-003 has high antiviral activity. In liver-humanized mice that were infected by HBV and with a very high viral DNA titer (~$10^9$ copies/mL), HH-003 effectively reduced serum HBV DNA level, and exhibited therapeutic effect via Fc-mediated immune functions. Meanwhile, no obvious toxicity associated with HH-003 was observed in liver-humanized mouse studies. Therefore, HH-003 has the potential to be used as an effective antiviral agent in patients with high HBV viral load, who are at immune tolerant or immune clearance phase. The inclusion and exclusion criteria of the subjects are specified as follows.

Inclusion Criteria
1) Participants fully understand the content of the trial, the process and possible adverse reactions, and sign the informed consent form;
2) Participants (including partners) have no pregnancy plans within the next 6 months and are willing to take effective contraceptive measures;
3) Male or female, age 18 to 35;
4) Body weight no less than 45 kg if male, no less than 40 kg if female. Body mass index (BMI): <28 Kg/m²;
5) HBsAg positive for more than 6 months and baseline HBsAg is 1000-100,000 IU/mL at enrollment;
6) HBe+;
7) For immune tolerant patients, baseline serum HBV DNA level of $10^7$-$10^9$ IU/mL and ALT<1.5×ULN; for immune clearance patients, baseline HBV DNA level >$10^5$ IU/mL and ALT (2-8)×ULN;
8) Immune tolerant patients total baseline bilirubin≤2× ULN; immune clearance patients baseline bilirubin≤3× ULN.

Exclusion Criteria
A CHB patient will be excluded if one or more of the following conditions apply:
1) Patients with liver diseases other than hepatitis B, including alcoholic, non-alcoholic fatty; drug-induced or autoimmune liver diseases; Gilbert syndrome or other genetic liver diseases;
2) Participation of any drug or medical device clinical trial within the last 3 months;
3) Hemoglobin <100 g/L; platelet count<100,000/ mm³ (100×$10^9$/L); absolute neutrophil count<1,500/ mm³ (1.5×$10^9$/L);
4) Albumin<35 g/L; INR>1.5; serum creatinine clearance rate<70 mL/min;
5) Electrocardiogram QTcF male>470 ms, female>480 ms, and other clinically significant abnormalities; poorly controlled hypertension;
6) AFP>100 ng/ml;
7) Decompensated liver disease (Child-Pugh-Score B or C);
8) Signs of decompensated liver cirrhosis;
9) Pregnancy, lactating, or pregnancy test positive;
10) Anti-HCV positive; Anti-HIV positive;
11) Allergic to any of the ingredients and excipients of the agent, or have a history of allergies to similar agents;
12) Any individual not suitable to participate in the trial as judged by the investigators.

This trial is commenced after the third cohorts of phase Ia (4.5 mg/kg) had completed the safety evaluation. Subjects received three doses of 3, 10, 20 and 40 mg/kg HH-003 injection, or placebo in every two weeks in consecutive dose-escalation cohorts to assess the safety profile and pharmacokinetics (PK) of HH-003, as well as preliminary anti-viral activity in CHB patients.

The safety data of finished 3 mg/kg cohort and partially finished 10 mg/kg cohort showed good safety in CHB patients.

The invention claimed is:

1. A method for treating HBV infection in a subject, comprising administering to the subject an effective amount of HH-003, wherein the HH-003 is administered at a dose of 3 mg/kg to 40 mg/kg, wherein the subject is human, wherein the HBV infection is chronic HBV infection, wherein HH-003 is an anti-pre-S1 antibody, wherein HH-003 comprises a heavy chain having the amino acid sequence of SEQ ID NO: 9 and a light chain having the amino acid sequence of SEQ ID NO: 10.

2. The method of claim 1, wherein the HH-003 is administered at a dose of 3 mg/kg, 4 mg/kg, 4.5 mg/kg, 5 mg/kg, 6 mg/kg, 7.5 mg/kg, 10 mg/kg, 12.5 mg/kg, 15 mg/kg, 17.5 mg/kg, 20 mg/kg, 22.5 mg/kg, 25 mg/kg, 27.5 mg/kg, 30 mg/kg, 32.5 mg/kg, 35 mg/kg, 37.5 mg/kg, or 40 mg/kg.

3. The method of claim 1, wherein the HH-003 is administered weekly, every 2 weeks, every 3 weeks, or every 4 weeks.

4. The method of claim 1, wherein the HH-003 is administered for a period of 4 to 16 weeks.

5. The method of claim 1, wherein the HH-003 is administered every 2 weeks for a period of 6 to 12 weeks.

6. The method of claim 1, wherein the method is carried out for a period of time such that the HBV is undetectable.

7. The method of claim 1, wherein the HH-003 is administered intravenously.

8. The method of claim 1, wherein the subject is over 18 years old.

9. The method of claim 1, wherein the method is effective to inhibit replication of the HBV in the subject and thereby treat the chronic HBV infection.

* * * * *